(12) United States Patent
Mitsumata et al.

(10) Patent No.: US 7,578,494 B2
(45) Date of Patent: Aug. 25, 2009

(54) SOLENOID VALVE

(75) Inventors: Naoki Mitsumata, Takahama (JP);
Fumiaki Murakami, Okazaki (JP);
Shigeru Nonoyama, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 51 days.

(21) Appl. No.: 11/703,212

(22) Filed: Feb. 7, 2007

(65) Prior Publication Data

US 2007/0181840 A1 Aug. 9, 2007

(30) Foreign Application Priority Data

Feb. 8, 2006 (JP) ............... 2006-030697

(51) Int. Cl.
*F16K 31/02* (2006.01)
(52) U.S. Cl. ................... 251/129.15; 251/337
(58) Field of Classification Search ............ 251/129.15, 251/337
See application file for complete search history.

(56) References Cited

U.S. PATENT DOCUMENTS

| | | | |
|---|---|---|---|
| 4,807,846 A * | 2/1989 | Greiner et al. | 251/129.15 |
| 6,595,485 B2 * | 7/2003 | Burrola et al. | 251/64 |
| 6,830,232 B2 * | 12/2004 | Burrola et al. | 251/64 |
| 7,047,763 B2 * | 5/2006 | Hirota | 62/527 |
| 7,055,539 B2 * | 6/2006 | Suzuki | 137/1 |
| 7,275,732 B2 * | 10/2007 | Kato et al. | 251/129.15 |

FOREIGN PATENT DOCUMENTS

JP 2001-182638 7/2001

OTHER PUBLICATIONS

Chinese Office Action dated Sep. 12, 2008 issued in counterpart Chinese Application No. 20070006293.4, with English translation.

* cited by examiner

*Primary Examiner*—John K Fristoe, Jr.
(74) *Attorney, Agent, or Firm*—Nixon & Vanderhye, PC

(57) ABSTRACT

A solenoid valve includes a coil, a stator core, a valve member, a coil spring, and a stopper. The coil provides a magnetic field when the coil is energized. The stator core includes a receiving bore, wherein the stator core generates a magnetic attractive force when the coil is energized. The valve member is attracted toward the stator core due to the magnetic attractive force generated by the stator core. The coil spring is received in the receiving bore of the stator core, wherein the coil spring biases the valve member in an opposite direction opposite from the stator core. The stopper positions the coil spring such that an outer peripheral surface of the coil spring is separated from an inner peripheral surface of the receiving bore.

10 Claims, 4 Drawing Sheets

SOLENOID VALVE

CROSS REFERENCE TO RELATED APPLICATION

This application is based on and incorporates herein by reference Japanese Patent Application No. 2006-30697 filed on Feb. 8, 2006.

BACKGROUND OF THE INVENTION

1. Field of the Invention

The present invention relates to a solenoid valve, in which a valve member is attracted by a magnetic attractive force in one direction and is biased in an opposite direction opposite from the one direction by a coil spring.

2. Description of Related Art

In a conventional valve, a valve member is attracted toward a stator core when a coil is energized, and the valve member is biased in a non-attracted direction opposite from the stator core by a coil spring. Also, the coil spring is received in a receiving bore formed in the stator core (see e.g., JP-A-2001-182638).

However, in a solenoid valve disclosed in JP-A-2001-182638, when the coil is energized, the coil spring is attracted by the stator core and then the coil spring may be displaced. In this case, an outer peripheral surface of the coil spring contacts an inner peripheral surface of the receiving bore of the stator core so that the coil spring slidably moves relative to the stator core. Thus, the coil spring and the stator core may be worn. Also, dusts due to the wear of the coil spring and the stator core are positioned around the sliding portion of the valve member, thereby disadvantageously causing a sliding fault of the valve member.

SUMMARY OF THE INVENTION

The present invention is made in view of the above disadvantages. Thus, it is an objective of the present invention to address at least one of the above disadvantages.

To achieve the objective of the present invention, there is provided a solenoid valve, which includes a coil, a stator core, a valve member, a coil spring, and a stopper. The coil provides a magnetic field when the coil is energized. The stator core includes a receiving bore, wherein the stator core generates a magnetic attractive force when the coil is energized. The valve member is attracted toward the stator core due to the magnetic attractive force generated by the stator core. The coil spring is received in the receiving bore of the stator core, wherein the coil spring biases the valve member in an opposite direction opposite from the stator core. The stopper positions the coil spring such that an outer peripheral surface of the coil spring is separated from an inner peripheral surface of the receiving bore.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
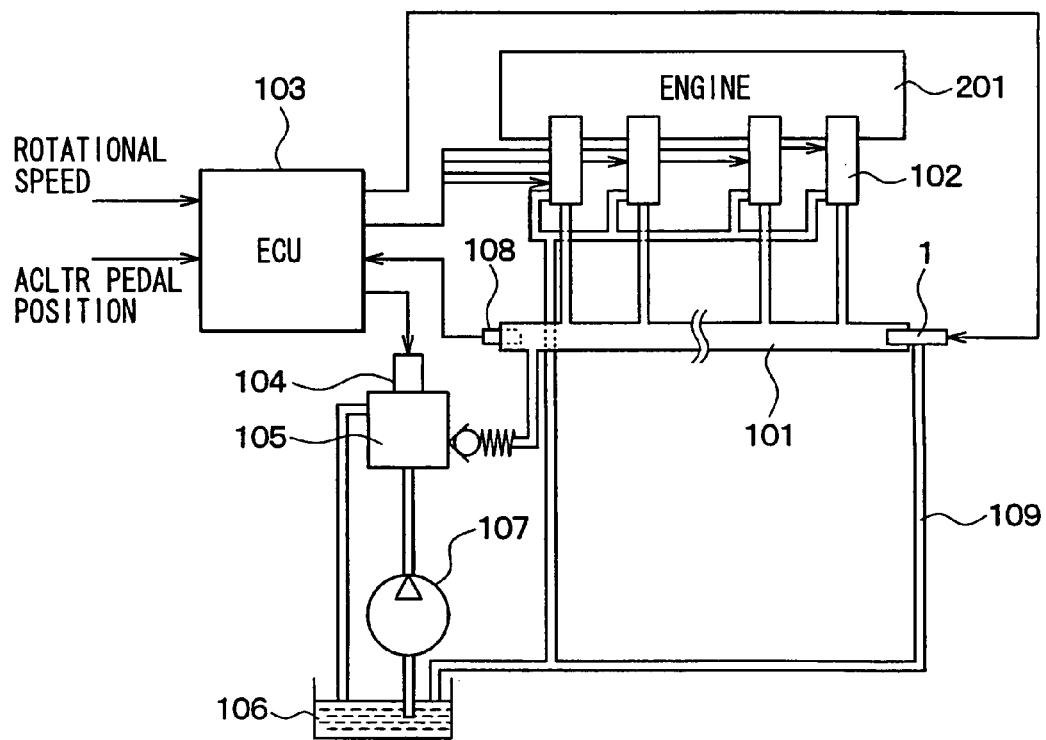
FIG. 1 is a schematic view of a common rail fuel injection system, which includes a solenoid valve according to a first embodiment of the present invention.

A first embodiment of the present invention will be described. FIG. 1 is a schematic view of a common rail fuel injection system, which includes a solenoid valve according to the first embodiment of the present invention. As shown in FIG. 1, the fuel injection system of the first embodiment includes an accumulator 101, a diesel engine 201, multiple injection valves 102, and an electronic control unit (ECU) 103. The accumulator 101 can accumulate high-pressure fuel. Each of the injection valves 102 is provided to a corresponding one of cylinders of the diesel engine 201, and is connected with the accumulator 101. Thus, the high-pressure fuel accumulated in the accumulator 101 is injected through each injection valve 102 to the corresponding cylinder. The ECU 103, which serves as control means, controls valve open timing and a valve open period of the injection valve 102.

The ECU 103 includes a microcomputer having a CPU, a ROM, and a RAM (not shown), and executes in order various processes stored in the microcomputer. The ECU 103 receives information, such as an engine rotational speed and a depressing amount (a pedal position) of an accelerator pedal (not shown). Then, the ECU 103 controls the injection valves 102, a pump amount control valve 104, and the solenoid valve 1 based on the information.

In the accumulator 101, the high-pressure fuel, which is pumped by a fuel pump 105, is accumulated at a predetermined pressure that corresponds to fuel injection pressure. A known variable delivery high-pressure pump serves as the fuel pump 105 and the fuel pump 105 compresses low-pressure fuel at high pressure. Here, the low-pressure fuel is supplied from a fuel tank 106, which serves as a low-pressure portion, through a feed pump 107. Based on signals supplied from a pressure sensor 108, which is provided to the accumulator 101, the ECU 103 drives the pump amount control valve 104 to control a pump amount such that the injection pressure becomes a predetermined value, which is determined based on a load and the rotational speed. Here, the pump amount control valve 104 is provided to the fuel pump 105.

The accumulator 101 is connected with the fuel tank 106 through a low-pressure passage 109, which constitutes a discharge passage. The solenoid valve 1 is located between the low-pressure passage 109 and the accumulator 101. The ECU 103 controls the solenoid valve 1 based on an operational state of the internal combustion engine 201. The high-pressure fuel in the accumulator 101 is returned to the fuel tank 106 through the low-pressure passage 109 when the solenoid valve 1 is opened. Thus, the pressure inside the accumulator 101 can be reduced to a target value.

Figure 2:
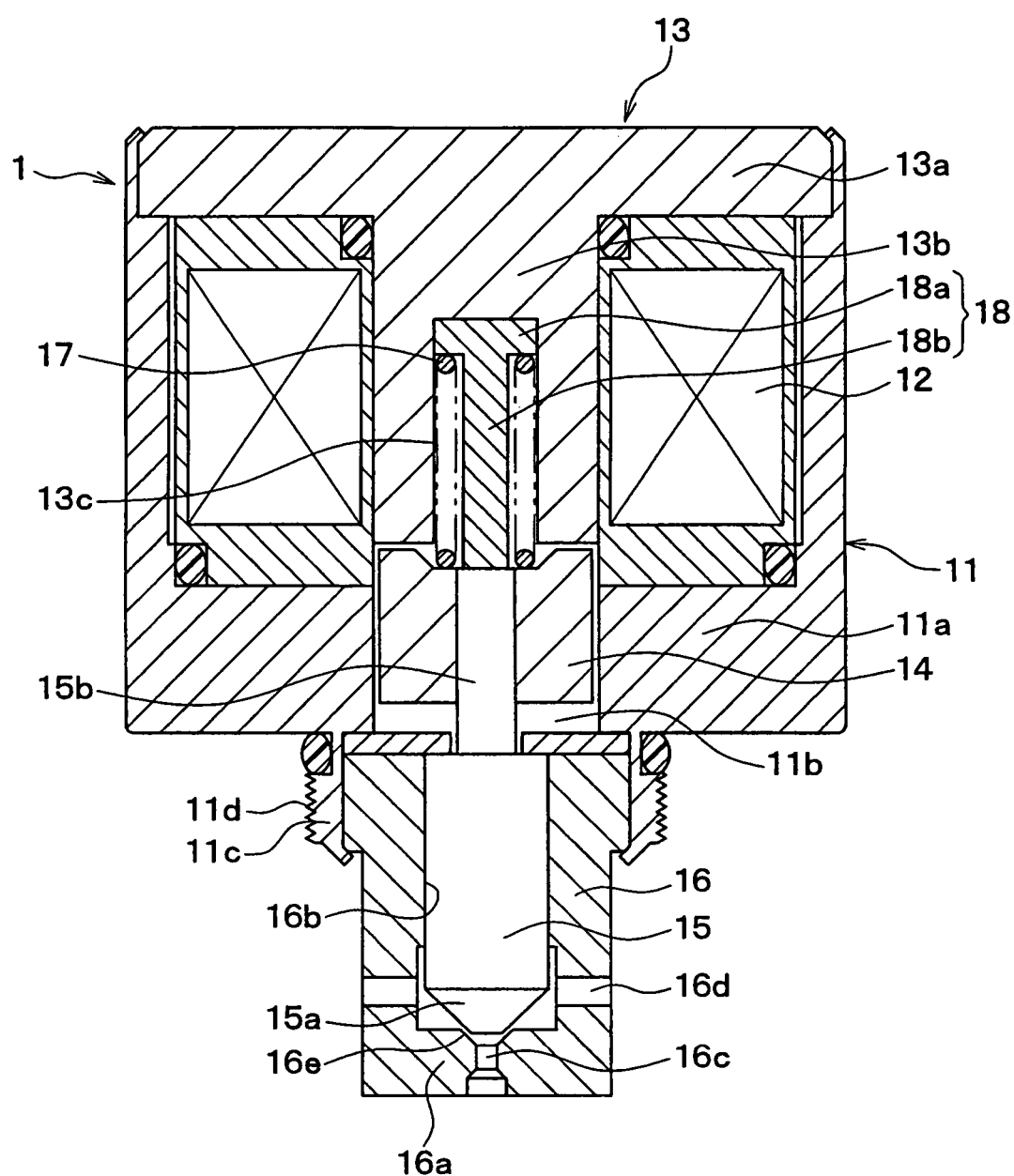
FIG. 2 is a sectional view of the solenoid valve shown in FIG. 1.

FIG. 2 is a sectional view showing a specific structure of the solenoid valve 1, and as shown in FIG. 2, the solenoid valve 1 includes a solenoid housing 11, which is a cylinder with a bottom. Specifically, one end of the solenoid housing 11 is open, and the solenoid housing 11 has a bottom portion 11a at the other end thereof. The solenoid housing 11 receives a tubular coil 12, which forms a magnetic field when the coil 12 is energized. An opening portion of the solenoid housing 11 is blocked by the stator core 13. The stator core 13 includes a discoid cap portion 13a and a column portion 13b. The cap portion 13a covers the opening portion of the solenoid housing 11, and the column portion 13b extends from a radial center portion of the cap portion 13a toward a space inside a tube of the coil 12.

The bottom portion 11a of the solenoid housing 11 includes a through hole 11b at a radial center portion of the bottom portion 11a, and the through hole 11b communicates with the space inside the tube of the coil 12b. The through hole 11b receives an armature 14 therein.

The solenoid housing 11, the stator core 13, and the armature 14 are all made of magnetic metal, and forms a magnetic circuit. Also, it is designed that when the coil 12 is energized, the armature 14 is attracted toward the stator core 13.

A valve housing 16, which supports a circular column valve body 15, is provided at an outer side of the bottom portion 11a of the solenoid housing 11. The valve housing 16 has an opening end on one end and a bottom portion 16a on another end such that the valve housing 16 has a cylindrical shape with a bottom. Also, the valve housing 16 includes a sliding bore 16b at a radial center portion of the valve housing 16. The sliding bore 16b extends in a longitudinal direction and slidably receives the valve body 15 therein.

A cylindrical tubular portion 11c is provided at an outer side of the bottom portion 11a of the solenoid housing 11. The valve housing 16 is fixed to the solenoid housing 11 by crimping an end portion of the tubular portion 11c. Also, a male thread 11d is provided at an outer periphery of the tubular portion 11c. Thus, with the male thread 11d, the solenoid valve 1 is fixed to the accumulator 101 (see FIG. 1).

The bottom portion 16a of the valve housing 16 includes a first discharge passage 16c at a radial center portion of the bottom portion 16a. The first discharge passage 16c longitudinally extends through the bottom portion 16a and communicates with the accumulator 101.

A cylindrical portion of the valve housing 16 includes a second discharge passage 16d, which radially extends through the cylindrical portion, and the second discharge passage 16d communicates with the low-pressure passage 109 (see FIG. 1).

A tapered valve seat 16e is formed coaxially with the first discharge passage 16c at a position of the bottom portion 16a of the valve housing 16. Here, the position faces with the valve body 15.

A tapered seat surface 15a is formed at a position of the valve body 15, the position facing the valve seat 16e. When the seat surface 15a is engaged with and disengaged from the valve seat 16e, the first discharge passage 16c is disconnected from and connected with the second discharge passage 16d, respectively.

A circular column rod 15b is integrally formed on an opposite side of the valve body 15 opposite from the seat surface 15a, and the circular column rod 15b extends into the through hole 11b of the solenoid housing 11. The armature 14 is press-fitted and fixed at an outer periphery of the rod 15b. Here, the armature 14 and the valve body 15 constitute a valve member of the present invention.

A circular column receiving bore 13c is formed at the column portion 13b of the stator core 13 at a radial center portion thereof. The receiving bore 13c extends in the longitudinal direction of the stator core 13, and an end portion on a valve body 15 side of the receiving bore 13c opens. As illustrated and understood from FIG. 2, the armature 14 has a top end surface (with reference to the orientation illustrated in FIG. 2) in opposed facing relation to the stator core 13 and the column portion 13b of the stator core 13 has a flat end surface facing the top end surface of the armature 14. As also illustrated and understood from FIG. 2, the top end surface of the armature 14 is disposed in a plane that is parallel to a plane or the flat end surface of the column portion 13b of the stator core 13. Moreover, the coil has a bottom end proximate the top end surface of the armature 14 and a top end remote from the armature. In the embodiment of FIG. 2, a bottom end surface of the coil is positioned above so as to be vertically spaced from the top end surface of the armature. More specifically, in this example, the armature and the coil are offset so that the armature and the coil do not overlap in a radial direction.

Also, the receiving bore 13c receives a coil spring 17 and a stopper 18. Here, the coil spring 17 biases the armature 14 and the valve body 15 in an opposite direction (non-attracted direction) opposite from the stator core 13. Also, the stopper 18 positions the coil spring 17.

The stopper 18 includes a large diameter portion 18a (first portion) and a small diameter portion 18b (second portion). Here, the large diameter portion 18a has a circular column shape and is provided at one side of the stopper 18 closer to a bottom portion (end portion) of the receiving bore 13c. Also, the small diameter portion 18b has a circular column shape and extends from a radial center portion the large diameter portion 18a toward the valve body 15. The small diameter portion 18b has a diameter (cross sectional area) smaller than that of the large diameter potion 18a.

The coil spring 17 is provided at an outer periphery of the small diameter portion 18b, and the small diameter portion 18b limits a movable range of the coil spring 17 in a radial direction. Therefore, the outer peripheral surface of the coil spring 17 is limited from being in contact with an inner peripheral surface of the receiving bore 13c. That is, the outer peripheral surface of the coil spring 17 is separated from the inner peripheral surface of the receiving bore 13c. Here, the outer peripheral surface of the coil spring 17 means a radially outer surface of the coil spring 17.

One longitudinal end of the coil spring 17 is supported by the large diameter portion 18a, and the other longitudinal end of the coil spring 17 is supported by the armature 14 or by the rod 15b of the valve body 15.

Also, when the armature 14 and the valve body 15 are attracted toward the stator core 13, the rod 15b of the valve body 15 contacts an end portion of the small diameter portion 18b. Therefore, the movable range of the armature 14 and the valve body 15 toward the stator core 13 is limited.

In the above structure, the coil 12 of the solenoid valve 1 is deenergized except for a case where the rotational speed of the internal combustion engine 201 is decreased. Specifically, the coil spring 17 biases the armature 14 and the valve body 15 in a valve closing direction such that the seat surface 15a of the valve body 15 engages with the valve seat 16e of the valve housing 16. Thus, the first discharge passage 16c is disconnected from the second discharge passage 16d.

In contrast, when the depressing amount of the accelerator pedal is suddenly reduced, in other words, when the rotational speed of the internal combustion engine 201 is reduced, the ECU 103 controls the solenoid valve 1 such that the solenoid valve 1 is opened. Then, the high-pressure fuel in the accumulator 101 is discharged into the fuel tank 106, and therefore, the pressure in the accumulator 101 is quickly reduced to the target value.

For example, the coil 12 of the solenoid valve 1 is energized such that the armature 14 is attracted toward the column portion 13b of the stator core 13 by the magnetic attractive force of the stator core 13. Then, the valve body 15, which is integrated with the armature 14, is displaced toward the column portion 13b. As a result, the seat surface 15a of the valve body 15 is disengaged from the valve seat 16e of the valve housing 16 such that the first discharge passage 16c is communicated with the second discharge passage 16d. Then, the high-pressure fuel in the accumulator 101 is discharged into the fuel tank 106 through the first and second discharge passages 16c, 16d and the low-pressure passage 109.

In the solenoid valve 1 of the present embodiment, the stopper 18 positions the coil spring 17 such that the outer peripheral surface of the coil spring 17 is limited from contacting the inner peripheral surface of the receiving bore 13c. Thus, the dust due to the friction between the coil spring 17 and the stator core 13 is not generated. As a result, the sliding fault of the valve body 15 due to the dust can be limited.

Here, in a duration experiment of the solenoid valve 1 of the present embodiment and a conventional solenoid valve, after operations of $10^7$ times, a wear amount of the inner peripheral surface of receiving bore 13c of the solenoid valve 1 was zero in contrast to 20 μm of the conventional solenoid valve.

Also, because the coil spring 17 does not slide with the stator core 13, the frictional resistance between the coil spring 17 and the stator core 13 is not generated when the coil spring 17 expands and contracts. As a result, an operation responsibility of the valve body 15 is improved.

Figure 3:
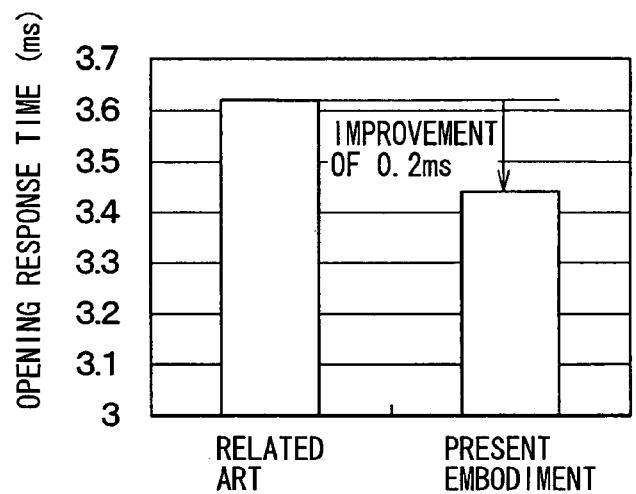
FIG. 3 is a chart showing an evaluation result of a response time for valve opening of the solenoid valve.

Here, in a case where the stopper 18 is made of a non-magnetic material, the responsibility of the solenoid valve 1 of the present invention is improved by 0.2 ms compared with the conventional solenoid valve when the coil 12 is energized (i.e., when the valve is opened) as shown in FIG. 3.

Second Embodiment

Figure 4:
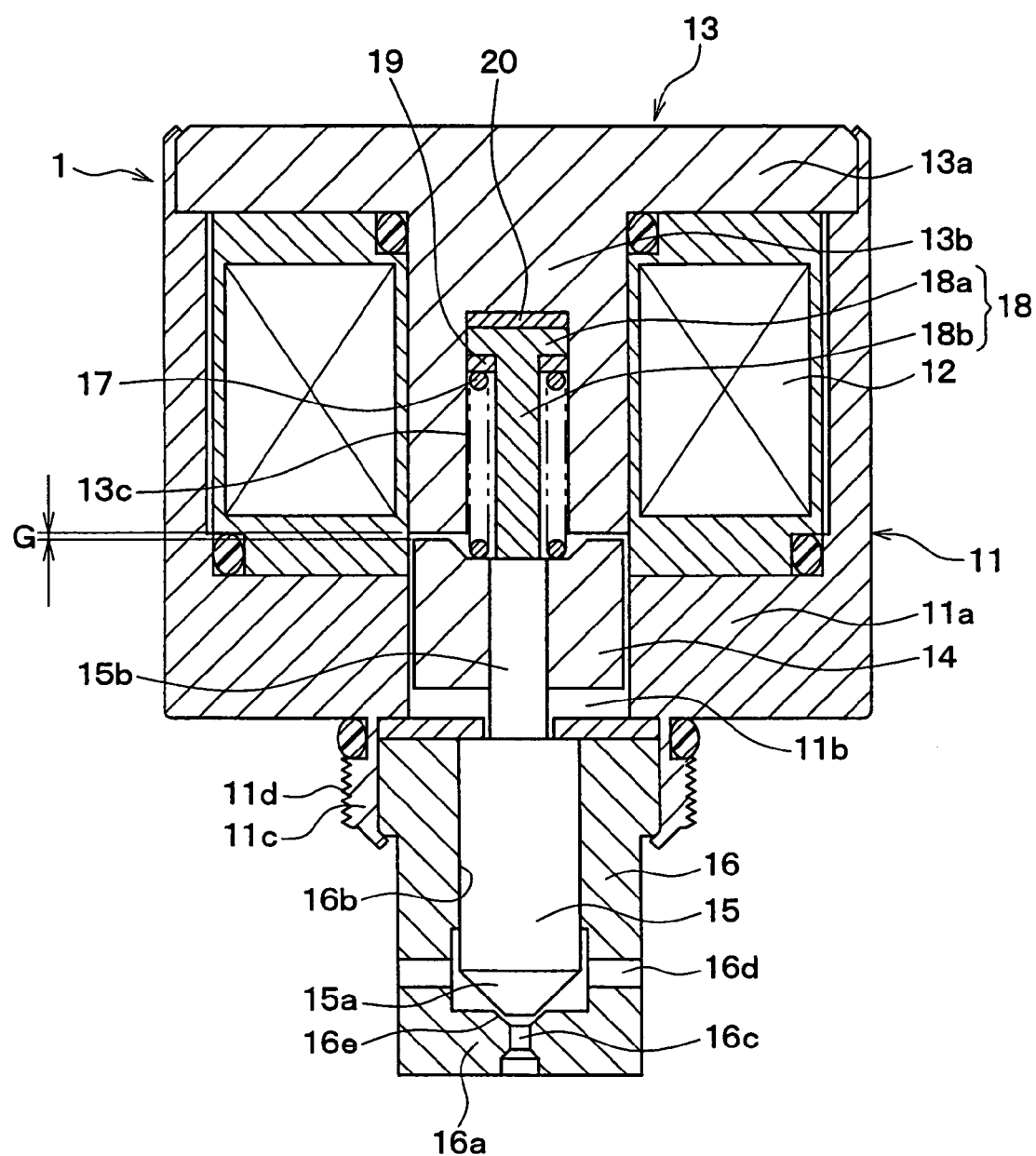
FIG. 4 is a sectional view showing a solenoid valve according to a second embodiment of the present invention.

A second embodiment of the present invention will be described. FIG. 4 is a sectional view of a solenoid valve according to the second embodiment of the present invention. Similar or equivalent components of the present embodiment similar to those of the first embodiment are denoted by the same numerals, and the explanation thereof will be omitted.

As shown in FIG. 4, in the present embodiment, a first shim 19 is provided between the one longitudinal end of the coil spring 17 and the large diameter portion 18a of the stopper 18 such that a set load (applied load) can be adjustable.

Also, a second shim 20 is provided between the bottom portion of the receiving bore 13c of the stator core 13 and the large diameter portion 18a of the stopper 18 such that an air gap G of the coil spring 17 (e.g., an air gap G between the armature 14 and an end face of the column portion 13b of the stator core 13) can be adjustable without changing the set load. As above, because the second shim 20 (an air gap adjusting shim for adjusting the air gap G) and the first shim 19 (a coil spring set load adjusting shim for adjusting the set load applied to the coil spring 17) can be provided individually, the air gap G and the set load can be adjusted and accuracy for adjusting the gap and load can be improved without degrading either of adjusting functions.

Third Embodiment

Figure 5:
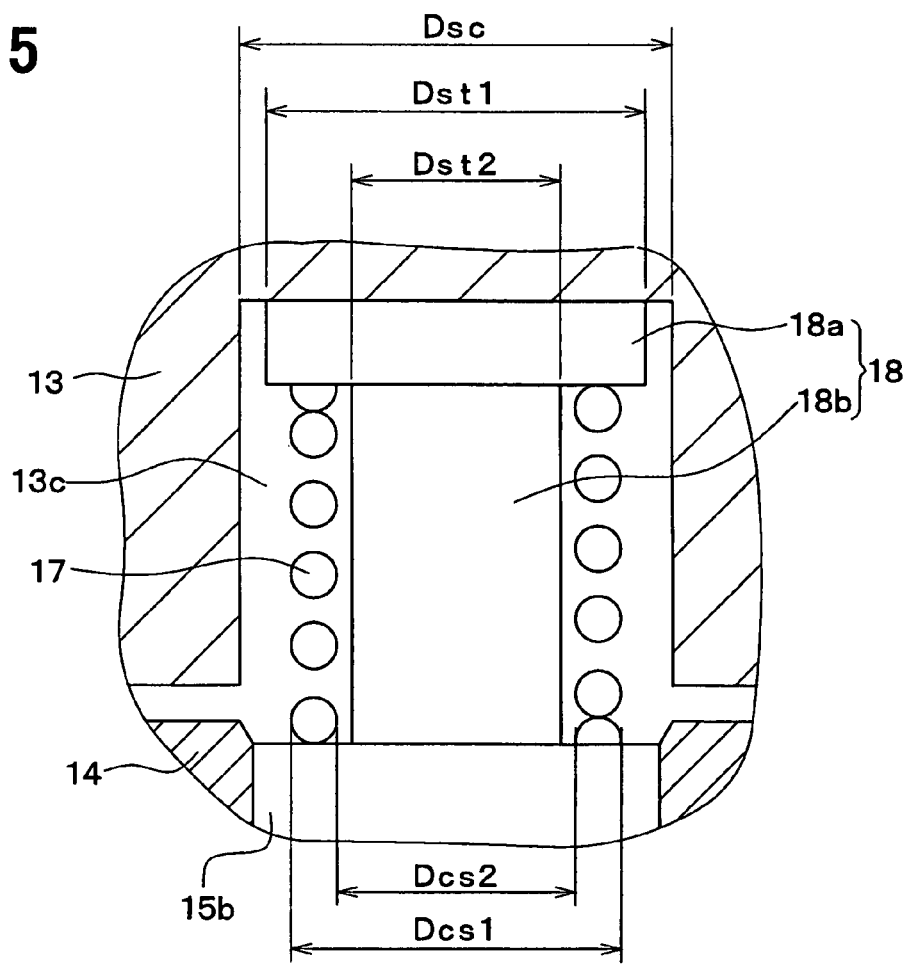
FIG. 5 is a sectional view showing a main portion of a solenoid valve according to a third embodiment of the present invention.

A third embodiment of the present invention will be described. FIG. 5 is a sectional view showing a main portion of a solenoid valve according to the third embodiment of the present invention. Similar or equivalent components of the present embodiment similar to those of the first embodiment are denoted by the same numerals, and the explanation thereof will be omitted.

As shown in FIG. 5, in the present embodiment, Dsc−Dcs1>(Dsc−Dst1)+(Dcs2−Dst2) is satisfied in a condition where the receiving bore 13c has an inner diameter of Dsc, the large diameter portion 18a has an outer diameter of Dst1, the small diameter portion 18b has an outer diameter of Dst2, the coil spring 17 has an outer diameter of Dcs1, and the coil spring 17 has an inner diameter of Dcs2. In this condition, the outer peripheral surface of the coil spring 17 is reliably limited from interfering with the inner peripheral surface of the receiving bore 13c.

Fourth Embodiment

Figure 6:
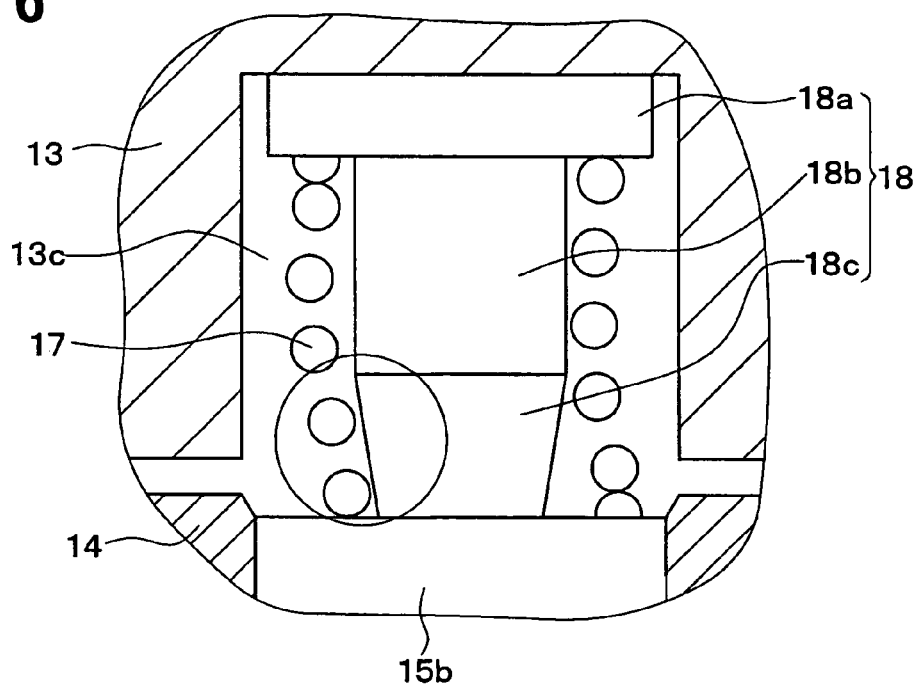
FIG. 6 is a sectional view showing a main portion of a solenoid valve according to a fourth embodiment of the present invention.

The fourth embodiment of the present invention will be described. FIG. 6 is a sectional view showing a main portion of a solenoid valve according to the fourth embodiment of the present invention. Similar or equivalent components of the present embodiment similar to those of the first embodiment are denoted by the same numerals, and the explanation thereof will be omitted.

As shown in FIG. 6, in the present embodiment, a tapered relief portion 18c (narrowing portion), a cross sectional area of which becomes smaller toward the armature 14, is formed at an armature 14 side of the small diameter portion 18b. In one embodiment, the relief portion 18c may have a frustum shape. Thus, even when the coil spring 17 is displaced due to the attractive force of the stator core 13, the relief portion 18c can limit the coil spring 17 from interfering with the stopper 18.

Other embodiment will be described. In each of the above embodiments, there is described the solenoid valve, which is applied to the common rail fuel injection system. However, the solenoid valve of the present invention can be applied to other use other than the common rail fuel injection system.

Additional advantages and modifications will readily occur to those skilled in the art. The invention in its broader terms is therefore not limited to the specific details, representative apparatus, and illustrative examples shown and described.

What is claimed is:

1. A solenoid valve comprising:
    a coil that provides a magnetic field when the coil is energized;
        a stator core that includes a receiving bore, wherein the stator core generates a magnetic attractive force when the coil is energized;
        a valve member that is attracted toward the stator core due to the magnetic attractive force generated by the stator core;
        a coil spring that is received in the receiving bore of the stator core, wherein the coil spring biases the valve member in an opposite direction opposite from the stator core; and
        a stopper that positions the coil spring such that an outer peripheral surface of the coil spring is separated from an inner peripheral surface of the receiving bore,
    wherein:
        the stopper includes:
            a first portion at one side of the stopper closer to an end portion of the receiving bore; and
            a second portion that extends from the first portion toward the valve member; and $D_{sc} < D_{st1}$ is satisfied in a condition where:
  the receiving bore has an inner diameter of $D_{sc}$; and
  the first portion has an outer diameter of $D_{st1}$;
the valve member includes an armature that is attracted toward the stator core, the armature having an end surface in opposed facing relation to the stator core;
the stator core has a column portion having the receiving bore therein;
the column portion of the stator core has a flat end surface facing said end surface of the armature;
said end surface of the armature is disposed in a plane that is parallel to a plane of the flat end surface of the column portion of the stator core;
the coil has a bottom end proximate said end surface of the armature and a top end remote from said end surface of the armature;
a bottom end surface of the coil is positioned above so as to be vertically spaced from said end surface of the armature; and
a majority of the stopper is received in the receiving bore.

2. The valve according to claim 1, wherein:
the second portion has a cross sectional area smaller than that of the first portion;
the coil spring is provided on an outer peripheral side of the second portion;
one longitudinal end of the coil spring is supported by the first portion; and
the other longitudinal end of the coil spring is supported by the valve member.

3. The valve according to claim 2, wherein:
the valve member is configured to contact the second portion when the valve member is attracted toward the stator core such that movement of the valve member toward the stator core is limited.

4. The valve according to claim 3, further comprising:
a shim that is provided between the end portion of the receiving bore and the first portion.

5. The valve according to claim 2, further comprising:
a shim that is provided between the one longitudinal end of the coil spring and the first portion.

6. The valve according to claim 5, wherein the shim provided between the one longitudinal end of the coil spring and the first portion is a first shim, the valve further comprising:
a second shim that is provided between the end portion of the receiving bore and the first portion.

7. The valve according to claim 2, wherein:
the second portion includes a narrowing portion, a cross sectional area of which becomes smaller toward the valve member, on a side of the second portion closer to the valve member.

8. The valve according to claim 1, wherein:
$D_{sc} - D_{cs1} > (D_{sc} - D_{st1}) + (D_{cs2} - D_{st2})$ is satisfied in a condition where:
the second portion has an outer diameter of $D_{st2}$;
the coil spring has an outer diameter of $D_{cs1}$; and
the coil spring has an inner diameter of $D_{cs2}$.

9. The valve according to claim 1, wherein:
the stopper is made of a non-magnetic material.

10. The solenoid valve according to claim 1, wherein the armature is offset from the coil so that the armature and the coil do not overlap in a radial direction.

* * * * *

UNITED STATES PATENT AND TRADEMARK OFFICE
CERTIFICATE OF CORRECTION

PATENT NO. : 7,578,494 B2 Page 1 of 1
APPLICATION NO. : 11/703212
DATED : August 25, 2009
INVENTOR(S) : Mitsumata et al.

It is certified that error appears in the above-identified patent and that said Letters Patent is hereby corrected as shown below:

In Column 7, line 1, "Dsc < Dst1" should be -- Dsc > Dst1 --

Signed and Sealed this

Twenty-third Day of February, 2010

David J. Kappos
*Director of the United States Patent and Trademark Office*